Nov. 15, 1966   C. L. WILSON   3,285,373
HITCH BRAKE
Filed Dec. 10, 1964
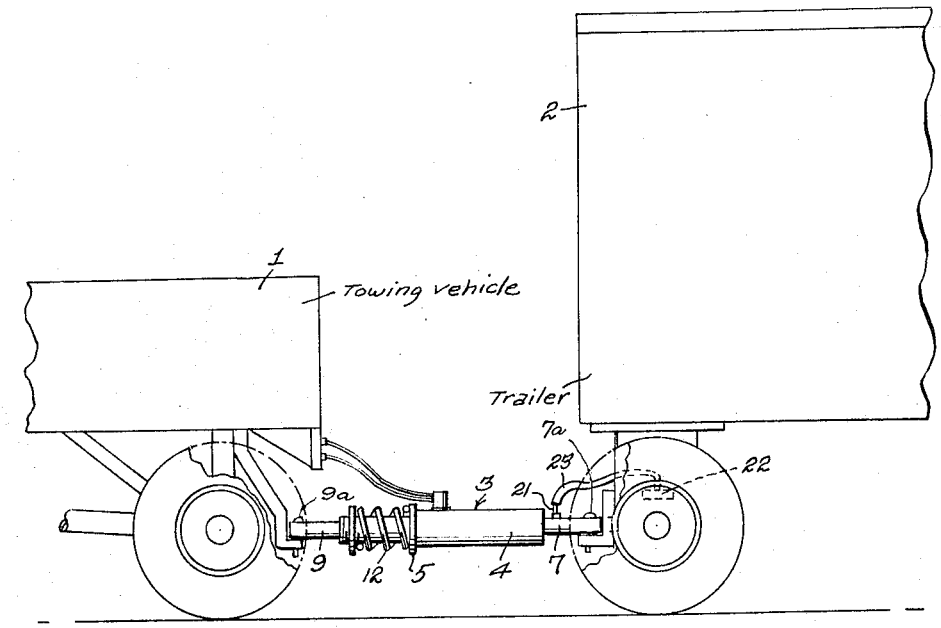
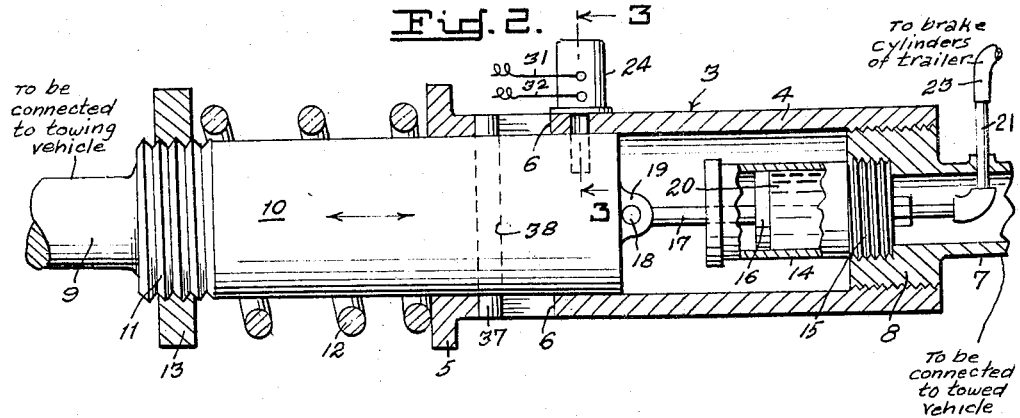
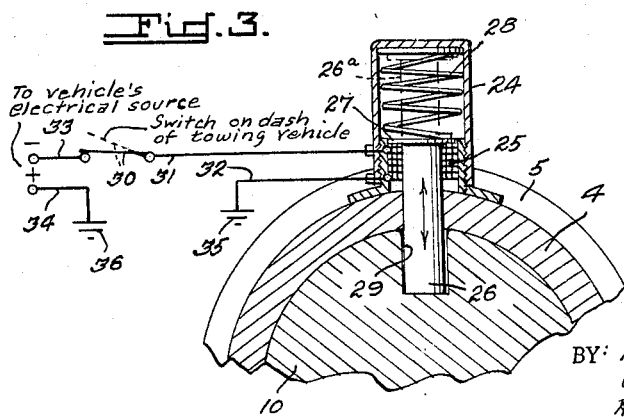
INVENTOR
Curtis L. Wilson
BY: Harry M. Saragovitz,
Edward J. Kelly &
Herbert Berl
ATTORNEYS.

United States Patent Office 3,285,373
Patented Nov. 15, 1966

3,285,373
HITCH BRAKE
Curtis L. Wilson, Box 1094, Sierra Vista, Ariz.
Filed Dec. 10, 1964, Ser. No. 417,522
1 Claim. (Cl. 188—112)

The invention described herein may be manufactured and used by or for the Government for governmental purposes, without the payment to me of any royalty thereon.

This invention relates to a hitch brake and more particularly to a combined hitch and hydraulic brake for use with trailer hitches, tow bars, etc., which is automatically operated by the vehicle being towed.

The present invention is especially advantageous for use on military vehicles when traveling in convey, and where almost every motor vehicle must tow another vehicle. For instance, a small vehicle, such as a jeep, can be extremely difficult to stop when towing a heavily laden trailer.

Stopping time and distances are reduced drastically by the automatic brake system of this invention.

The present invention provides a maximum measure of control and safety, not possible with existing brake systems that require the brakes of the towing vehicle to stop both vehicles. Further, no additional connections are necessary since the device is an integral part of the trailer hitch.

It is therefore a primary object of this invention to provide a hydraulic braking device combined with a trailer hitch and which device is operative to set brakes on a trailer in response to pressure of the trailer upon the braking device when the trailer tends to move faster than the towing vehicle and to release brakes on the trailer when the trailer is decelerated.

Another object is to provide a braking device incorporated with a trailer hitch, thereby eliminating extra couplings.

Another object of the invention is to prevent overload on the brakes of the towing vehicle.

A further object of the invention is to provide a braking device between a towing and a towed vehicle that will provide a shorter stopping distance when the brakes are applied.

A final object is to provide a combined trailer hitch and hydraulic braking device that is simple of construction, easy to install and economical in manufacture.

The specific nature of the invention as well as other objects and advantages thereof, will clearly appear from a description of a preferred embodiment such as shown in the accompanying drawings in which:

FIG. 1 is a side elevation showing the hitch brake of the invention between a towing vehicle and a trailer;

FIG. 2 is an axial section through the hitch brake and in inoperative position; and FIG. 3 is a cross sectional view taken along line 3—3 of FIG. 2 and showing the device in a locked position.

Referring now to the drawing, reference character 1 denotes a towing vehicle, a portion of the rearward end being schematically shown.

The forward portion of a trailer, also shown schematically, is indicated by 2.

The hitch brake is designated generally by 3 and is connected by an expedient manner such as explained further.

The hitch brake 3 comprises a tubular sleeve 4 (see FIG. 2) having a flange 5 and a pair of diametrically disposed, elongated slots 6.

A tubular shaft 7 having an enlarged, externally threaded head portion 8 integral thereon, is screwed into one end of tubular sleeve 4 as shown. Shaft 7 serves, as a linking member to the towed vehicle 1 and is connected thereto by a coupling pin 7a.

Reference character 9 designates a shaft having an enlarged piston portion 10 integral with one end thereof. Shaft 9 serves as a connecting member to towing vehicle 1 and is connected thereto by a coupling pin 9a.

Piston portion 10 is slidably mounted in sleeve 4, as shown in FIG. 2 and is provided with external threads 11 along a portion adjacent shaft 9.

A coil spring is indicated by 12 and encircles piston 10. A spring tension adjusting collar 13 is threadably mounted on the externally threaded portion 11 and serves to adjust the tension on coil spring 12.

A hydraulic master brake cylinder 14 is axially secured on enlarged portion 8 by threads 15.

Master brake cylinder 14 is of the dashpot type and is more or less shown schematically, the essential operating elements being a piston 16 and piston rod 17, which is connected by a pivot 18 to ears 19 on the face of piston portion 10. Brake fluid is designated by 20 in master brake cylinder 14 and a conduit 21 which is attached to one end of the cylinder 14 leads to the brake cylinders of the trailer. One brake cylinder 22 is shown schematically in dotted lines. Conduit 21 may be connected to the trailer's brake cylinder, or cylinders, by flexible line 23 or by any expedient manner that permits quick attachment, or detachment, from the trailer's brake system.

Disconnect means are provided whereby the hitch brake may be made inoperative when the trailer 2 is backed. These means are shown in FIG. 3.

A solenoid 24 is mounted on sleeve 4 as shown in FIG. 2 and consists of a coil 25 and a soft steel armature or plunger 26 slidable therein.

A soft iron disc 27 is secured to the upper end of plunger 26 and a coil spring 28 the lower end of which is welded on disc 27 normally pulls plunger 26 out of a radial bore 29 in piston portion 10. The retracted position of plunger 29 is shown by dotted lines 26a.

Solenoid 28 is electrically connected to a switch 30 by leads 31 and 32.

Switch 30 is electrically connected by leads 33 and 34 to the towing vehicle's electrical source (not shown) such as a battery.

Leads 32 and 34 may be grounded as at 35 and 36 respectively, the ground being the braking device or the towing vehicle's frame etc.

Switch 30 may be located in the towing vehicle's dash.

Means for preventing piston 10 from sliding beyond a predetermined distance in sleeve 4 is provided and consists of a retaining pin 37 fixed diametrically in a bore 38 through piston portion 10 and protrudes at each of its ends into slots 6, as seen in FIG. 2.

The operation of the device is extremely simple, yet positive of action.

It will be obvious that the trailer 2 cannot ram forward (such as when the towing vehicle 1 is going downhill, or slowing, or stopping) without actuating the brakes on towed vehicle 2.

Normally the towing car and the trailer roll along with the plunger 26 in retracted position within the casing of solenoid 24. When for any of the above three reasons the trailer pushes against the hitch to an extent such that the sleeve 4 overcomes the preset pressure of spring 12, the said sleeve slides along piston 10. This results in the brake liquid within brake cylinder 14 being forced out of the said cylinder on account of the relative movement between sleeve 4 and cylinder 14 which is attached to piston 10. Thus the brake fluid is supplied through conduits 21, 23 to the respective brake cylinders 22.

Upon deceleration of the trailer 2, spring 12 will reassume its original position, thus taking pressure off the brake cylinder 14 and thereby stopping the braking action.

Thus the brakes of vehicle 2 respond instantly to pressure or release on brake piston 16, thus preventing wear and tear on the brakes of the towing vehicle 1 and possible "jack-knifing" of the trailer 2 on slippery roads, etc.

Spring 12 acts also as a buffing means to prevent full application of the trailer's brakes in transit.

Retaining pin 37 prevents rotation of piston portion 10 in sleeve 4 as well as limiting its sliding movement thereon to prevent withdrawal therefrom and injury to master brake cylinder 14.

The disconnecting means of the invention are to render the brake inoperative when the trailer 2 is backed or being pushed by another vehicle, such as its being "jockeyed" into parking positions.

The driver of the towing vehicle 1 merely closes switch 30 to energize solenoid 24 to urge plunger 26 into bore 29 and prevent sliding of piston portion 10 in sleeve 4.

Variations and modifications may be effected without departing from the scope of the novel concept of the present invention as set forth in the appended claim.

What is claimed is:

A combined hitch brake between a towing and a towed vehicle comprising, in combination, a tubular sleeve having a flange at one of its ends and a pair of diametrically disposed, elongated slots in its wall; a first shaft having an enlarged, externally threaded head portion engaged in the other end of said tubular sleeve, said first shaft serving as a linking member to the towed vehicle; a second shaft having an enlarged piston portion at one of its ends, its other end serving as a connecting member to the towing vehicle, said piston portion being slidable in said tubular sleeve and having external threads along a portion of its outer end and a pair of axially disposed ears integral with its inner end; a collar threadably engaged on said external threads on said piston; a buffer spring encircling said piston between said collar and said flange on said tubular sleeve for preventing full application of the brakes of the towed vehicle while in transit, its tension being preset by adjustment of said collar; a hydraulic brake housing threadably engaged axially in said head portion of said first shaft and being in fluid connection with the brakes of the towed vehicle, there being a rod and piston assembly slidable in said housing, the rod being pivoted to said ears on the piston of said second shaft whereby axial movement thereof will move said rod and piston assembly to effect application or release of the brakes of the towed vehicle; a solenoid fixed on said tubular sleeve and having an armature and a spring loaded plunger slidable therein, there being a radial bore in said piston on said second shaft and being adapted to receive said plunger, and a switch in electrical connection with said armature whereby when said switch is closed, said armature is energized and said plunger will move into said bore when said second shaft is in a position to cause release of the brakes of said towed vehicle to render its brakes inoperative; and a pin diametrically fixed in said piston on said second shaft, its ends extending into said elongated slots in said tubular sleeve to regulate axial movement of said piston within said tubular sleeve.

References Cited by the Examiner

UNITED STATES PATENTS

| | | | |
|---|---|---|---|
| 2,260,637 | 10/1941 | Ovenhouse | 188—112 |
| 2,483,074 | 9/1949 | Swain | 188—112 |
| 2,786,554 | 3/1957 | Yadro | 188—112 |
| 2,848,074 | 8/1958 | Puddy | 188—112 |
| 2,921,652 | 1/1960 | Smith | 188—112 |

DUANE A. REGER, *Primary Examiner.*